(12) United States Patent
Addepalli et al.

(10) Patent No.: US 9,037,896 B2
(45) Date of Patent: May 19, 2015

(54) ROOT CAUSE ANALYSIS IN A SENSOR-ACTUATOR FABRIC OF A CONNECTED ENVIRONMENT

(71) Applicant: Cisco Technology, Inc., San Jose, CA (US)

(72) Inventors: Sateesh K. Addepalli, San Jose, CA (US); Raghuram S. Sudhaakar, Mountain View, CA (US); Kevin C. Lee, Milpitas, CA (US); Jean-Philippe Vasseur, Saint Martin d'Uriage (FR)

(73) Assignee: Cisco Technology, Inc., San Jose, CA (US)

( * ) Notice: Subject to any disclaimer, the term of this patent is extended or adjusted under 35 U.S.C. 154(b) by 226 days.

(21) Appl. No.: 13/668,979

(22) Filed: Nov. 5, 2012

(65) Prior Publication Data

US 2014/0129876 A1 May 8, 2014

(51) Int. Cl.
*G06F 11/00* (2006.01)
*G06F 11/07* (2006.01)

(52) U.S. Cl.
CPC .................................. *G06F 11/0709* (2013.01)

(58) Field of Classification Search
CPC .. G06F 11/0709; G06F 11/079; H04Q 3/0075
See application file for complete search history.

(56) References Cited

U.S. PATENT DOCUMENTS

| | | | |
|---|---|---|---|
| 5,864,662 A * | 1/1999 | Brownmiller et al. | 714/43 |
| 6,691,250 B1 | 2/2004 | Chandiramani et al. | |
| 7,054,262 B2 | 5/2006 | Gerstel | |
| 7,281,170 B2 * | 10/2007 | Taylor et al. | 714/48 |
| 7,296,194 B1 * | 11/2007 | Lovy et al. | 714/57 |
| 7,505,450 B2 | 3/2009 | Castagnoli | |
| 7,920,466 B2 | 4/2011 | Vasseur | |
| 8,116,227 B1 | 2/2012 | Prairie et al. | |
| 8,254,272 B1 | 8/2012 | Vasseur | |
| 8,627,150 B2 * | 1/2014 | Sambamurthy et al. | 714/47.3 |

(Continued)

OTHER PUBLICATIONS

Pozzi, Sandra, "Notification of Transmittal of the International Search Report and the Written Opinion of the International Searching Authority, or the Declaration", Patent Cooperation Treaty, International Appl. No. PCT/US2013/067473, mailed Dec. 16, 2013, 13 pages, European Patent Office, Rijswijk, Netherlands.

(Continued)

*Primary Examiner* — Christopher McCarthy
(74) *Attorney, Agent, or Firm* — Parker Ibrahim & Berg LLC; James M. Behmke; Stephen D. LeBarron (57) ABSTRACT

In one embodiment, the techniques herein provide that a node may receive indicia of a fault state in one or more components of a computer network. Based on the indicia, the node may then identify a network dependency group including a plurality of network components that are hierarchically associated with the one or more components. The node may then receive, from a database, a time series of performance data values corresponding to the network dependency group, wherein the time series comprises performance data values from before and after the onset of the fault state. The node may then identify altered performance data values in the time series comprising values which differ before and after onset of the fault state, and then determine a root cause of the fault state by identifying one or more particular components within the network dependency group that are associated with the altered performance data values.

20 Claims, 9 Drawing Sheets

(56) References Cited

U.S. PATENT DOCUMENTS

| | | |
|---|---|---|
| 2009/0161554 A1 | 6/2009 | Agarwal et al. |
| 2010/0157788 A1* | 6/2010 | Ellis et al. ............... 370/216 |
| 2010/0318853 A1* | 12/2010 | Beg et al. ................ 714/37 |
| 2011/0154367 A1* | 6/2011 | Gutjahr et al. ........... 719/316 |
| 2012/0173927 A1* | 7/2012 | Rymeski et al. .......... 714/26 |
| 2012/0185736 A1* | 7/2012 | Sambamurthy et al. .... 714/47.3 |
| 2012/0230212 A1 | 9/2012 | Kaplan et al. |

OTHER PUBLICATIONS

Winter, et al., "RPL: IPv6 Routing Protocol for Low-Power and Lossy Networks", Request for Comments 6550, Mar. 2012, 157 pages, The IETF Trust.

* cited by examiner

FIG. 3B $$X_1 = \begin{array}{c|cccccccc|}
 & N_1 & N_2 & N_3 & N_4 & N_5 & N_6 & N_7 & N_n \text{ (FAULT)} \\
M_1 & 10 & 8 & 9 & 8 & 10 & 8 & 9 & 8 \\
M_2 & 8 & 8 & 8 & 8 & 9 & 8 & 10 & 8 \\
M_3 & 10 & 9 & 10 & 9 & 10 & 9 & 10 & 9 \\
M_4 & 7 & 8 & 9 & 8 & 9 & 8 & 9 & 15 \\
M_5 & 8 & 10 & 8 & 8 & 7 & 8 & 9 & 20 \\
M_6 & 8 & 8 & 9 & 10 & 9 & 8 & 9 & 25 \\
M_7 & 10 & 10 & 7 & 8 & 8 & 8 & 9 & 25 \\
M_n & 9 & 9 & 9 & 9 & 10 & 9 & 10 & 25 \\
\end{array}$$

TIME ↓     DAY →

FIG. 4A

FIG. 4B $$\min_{X_N, X_R} \|X_N\|_* + \lambda \|X_R\|_1, \quad \text{subject to} \quad X = X_N + X_R$$

EQ (1)

$$\min f(Y), \quad \text{subject to} \quad h(Y) = 0$$
$$\text{where } f : R^n \longrightarrow R^n \text{ and } h : R^n \longrightarrow R^n.$$

EQ (2)

$$L(Y, Z, \mu) = f(Y) + \langle Z, h(Y) \rangle + \frac{\mu}{2} \|h(Y)\|_F^2$$

EQ (3)

$$Y = (X_N, X_R), \quad f(Y) = \|X_N\|_* + \lambda \|X_R\|_1, \quad h(Y) = X - X_N - X_R$$

EQ (4)

$$L(X_N, X_R, Z, \mu) = \|X_N\|_* + \lambda \|X_R\|_1 + \langle Z, X - X_N - X_R \rangle + \frac{\mu}{2} \|X - X_N - X_R\|_F^2$$

ROOT CAUSE ANALYSIS IN A SENSOR-ACTUATOR FABRIC OF A CONNECTED ENVIRONMENT

TECHNICAL FIELD

The present disclosure relates generally to computer networks, and, more particularly, to root cause analysis in sensor-actuator fabrics (e.g., "smart grid" technologies).

BACKGROUND

Recent trends indicate that the future will progress towards sensor-actuator based automation in various sectors including buildings, communities/cities, transportation, energy, etc. Experts predict that in the coming decades there will be a fabric of trillions of sensor-actuator devices embedded into our surroundings. This sensor-actuator fabric (SAF) will bring about integrated automation that will greatly improve the efficiency of the environment and/or resources, as well as the quality of living for those within the environment. A SAF may be comprised of thousands, millions, or even trillions of electronic devices/nodes that interact with one another in the context of a connected environment. The electronic devices/nodes within a SAF typically have a finite lifetime and/or less than 100% reliability. In view of the interconnected nature of a SAF, a fault in, or failure of, an electronic device/node within the fabric is problematic because it may lead to a fault/misbehavior of the fabric that may lead to catastrophic consequences.

Robust techniques of fault detection and root cause analysis are thus generally desired in order to maintain data transmission reliability and control delays within a SAF. Conventional practice for determining the root cause of a fault within a SAF is to monitor a pre-defined list of performance metrics for unexpected degradations and/or behaviors. However, since there are potentially thousands of time-series metrics that can be created from the available data within a SAF, the amount of data subject to root cause analysis may be massive. Moreover, root cause analysis of such data is typically performed manually, which is cumbersome, error-prone, and difficult/impossible to scale.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, the techniques herein provide that a node may receive indicia of a fault state in one or more components of a computer network. Based on the indicia, the node may then identify a network dependency group including a plurality of network components that are hierarchically associated with the one or more components. The node may then receive, from a database, a time series of performance data values corresponding to the network dependency group, wherein the time series comprises performance data values from before and after the onset of the fault state. The node may then identify altered performance data values in the time series comprising values which differ before and after onset of the fault state, and then determine a root cause of the fault state by identifying one or more particular components within the network dependency group that are associated with the altered performance data values.

Description

A computer network is a geographically distributed collection of nodes interconnected by communication links and segments for transporting data between end nodes, such as personal computers and workstations, or other devices, such as sensors, electronic devices, nodes, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), sensor-actuator fabric (SAF), etc. Generally, size and cost constraints on smart object nodes (e.g., sensors) result in corresponding constraints on resources such as energy, memory, computational speed and bandwidth.

Figure 1:
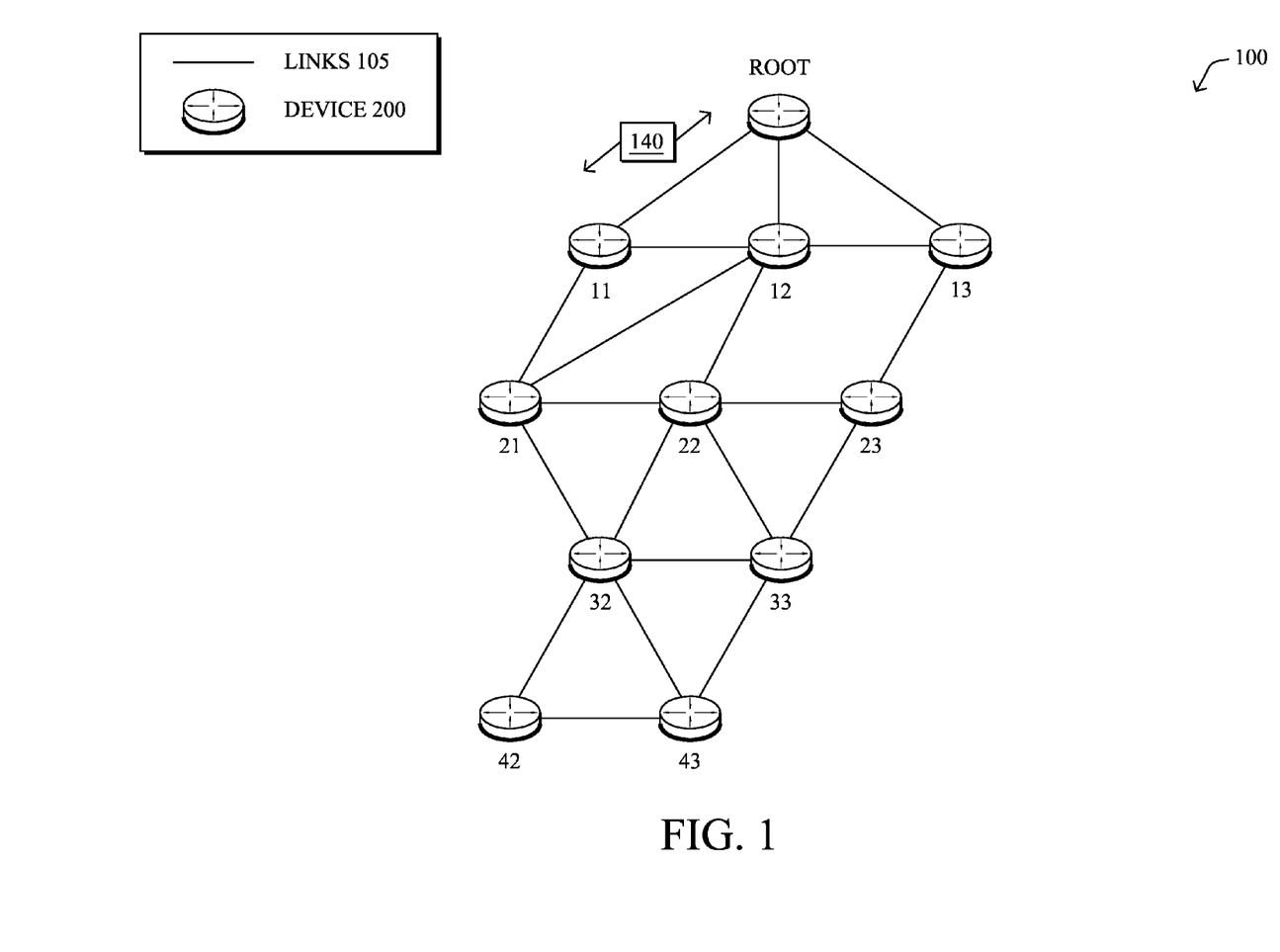
FIG. 1 illustrates an example communication network.

FIG. 1 is a schematic block diagram of an example computer network 100 illustratively comprising nodes/devices 200 (e.g., labeled as shown, "root," "11," "12," ... "45," and described in FIG. 2 below) interconnected by various methods of communication. For instance, the links 105 may be wired links or shared media (e.g., wireless links, PLC links, etc.) where certain nodes 200, such as, e.g., routers, sensors, actuators, computers, etc., may be in communication with other nodes 200, e.g., based on distance, signal strength, current operational status, location, etc. Those skilled in the art will understand that any number of nodes, devices, links, etc., may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
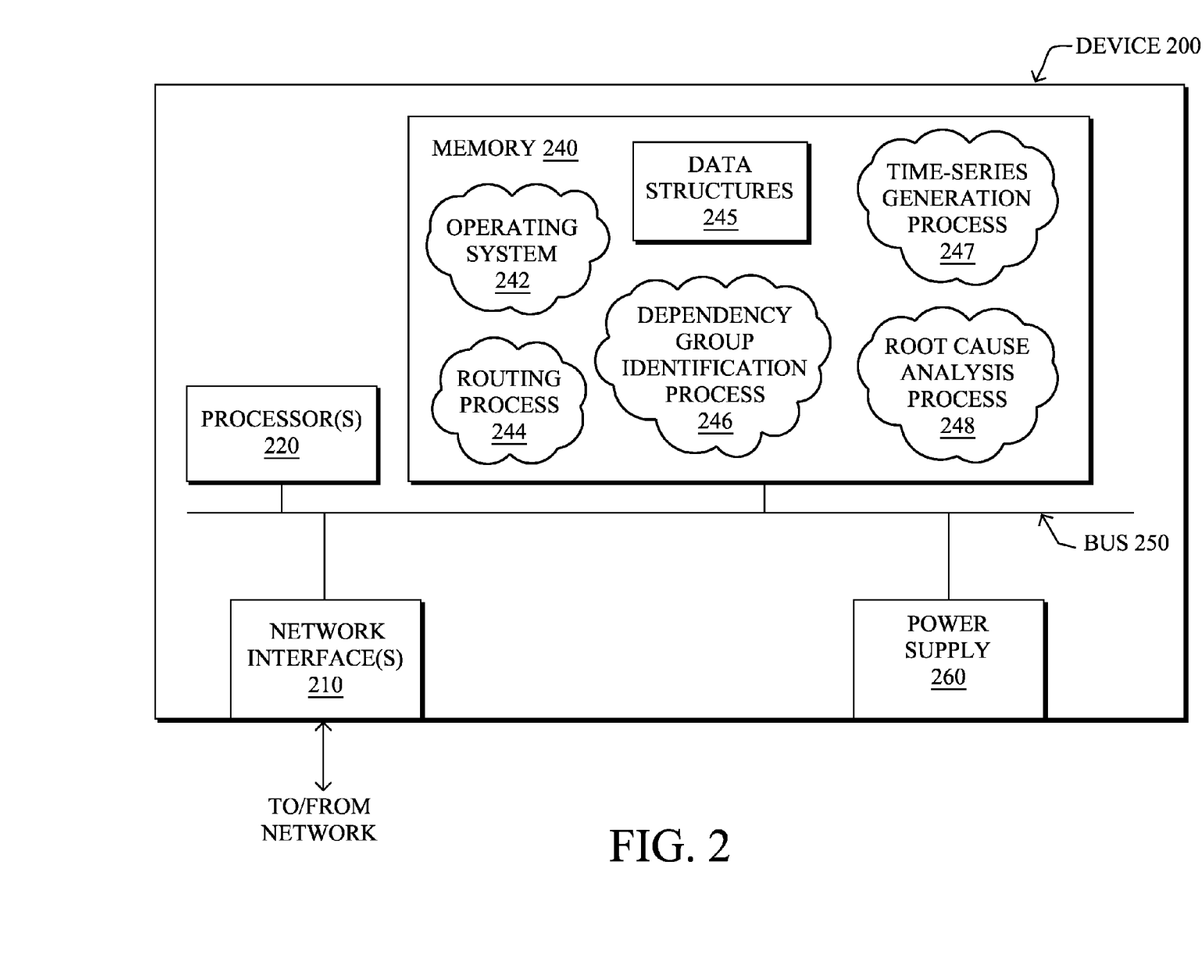
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244, a dependency group identification process 246, a time-series generation process 247, and an illustrative "root cause analysis" process 248, as described herein. Note that while certain processes are shown in centralized memory 240, alternative embodiments provide for one or more of the processes to be specifically operated within other dedicated components, such as the network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Also, a directed acyclic graph (DAG) is a directed graph having the property that all edges are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Note also that a tree is a kind of DAG, where each device/node in the DAG generally has one parent or one preferred parent. DAGs may generally be built (e.g., by DAG process 246 and/or routing process 244) based on an Objective Function (OF). The role of the Objective Function is generally to specify rules on how to build the DAG (e.g. number of parents, backup parents, etc.).

As noted above, robust techniques of fault detection are important in order to maintain the integrity and data transmission reliability of a SAF, and to prevent/mitigate the possibility of cascading failures propagating throughout the fabric network. In order to mitigate faults in a SAF in a timely manner, it is highly desirable to detect changes in fabric behavior in substantially real-time (e.g., within seconds, minutes, or hours). However, detection and mitigation of such SAF faults can be problematic for a variety of reasons. For example, fault detection in a SAF is complicated by the fact that there is generally insufficient time to process the data generated by the SAF by, for example, aggregating and smoothing out the data to eliminate diverse characteristics (e.g., seasonality, variability, etc.) of different data sources and identify long-term performance impact. Additionally, field technicians may address a perceived fault in the SAF, and then determine that there is still an observable misbehavior in the fabric, raising the question of whether or not the original fault was addressed properly and/or completely fixed. Alternatively, field technicians may assess the wrong SAF metric, and declare incorrectly that the fault has been fixed, only to realize the fault was not fixed when subsequent cascading degradations of multiple system points are observed in the SAF. These types of circumstances make it difficult to pinpoint the root cause of performance changes within a SAF.

Root Cause Analysis in a Connected Environment

According to the techniques described herein, one or more capable nodes (e.g., Root, LBR, etc.) may automatically identify any statistically significant change(s) within a sensor-actuator fabric (SAF) that may represent a potential fault event(s), without relying on detailed domain knowledge to determine what may, or may not, have gone wrong in order to generate the fault or faults within the SAF (e.g., the root cause). As discussed further below, for each potential fault event(s) in the SAF, one or more capable nodes may identify a group of nodes/devices (e.g., a network dependency group) comprising electrical devices, sensors, actuators, network devices, routers, servers, etc., that could be impacted by the fault event, and then derive a list of performance metrics of the group of nodes/devices for time-series analysis. The performance metric data may be normalized (e.g., all timestamps converted to GMT, common router naming conventions, etc.) to facilitate analysis across different layers, devices, and metrics. The one or more capable nodes may use a multiscale local subspace (MLS) algorithm to rapidly detect changes in performance that are induced by the potential fault event when the baseline is contaminated by other changes due to previous failures. Additionally, the techniques herein are capable of using short-term and historical tracking of the performance metrics to detect fault events that may arise, for example, as a result of the repair of another fault or faults. Importantly, the techniques herein provide the ability to detect changes induced by faults and the ability to track and locate failures while maintaining data integrity across the system and having the flexibility to operate at multiple time scales to capture the impact.

Specifically, according to one or more embodiments of the disclosure as described in detail below, the techniques herein provide that a node may receive indicia of a fault state in one or more components of a computer network. Based on the indicia, the node may then identify a network dependency group including a plurality of network components that are hierarchically associated with the one or more components. The node may then receive, from a database, a time series of performance data values corresponding to the network dependency group, wherein the time series comprises performance data values from before and after the onset of the fault state. The node may then identify altered performance data values in the time series comprising values that differ before and after onset of the fault state, and then determine a root cause of the fault state by identifying one or more particular components within the network dependency group that are associated with the altered performance data values.

Illustratively, the techniques described herein may be performed by hardware, software, and/or firmware, such as in accordance with the "root cause analysis" process 248, which may contain computer executable instructions executed by the processor 220 (or independent processor of dedicated components) to perform functions relating to the techniques described herein, e.g., in conjunction with routing process 244, dependency group identification process 246, and time-series generation process 247.

Operationally, the techniques herein generally relate to fault detection in a SAF, e.g., faulty nodes reporting abnormal sensed values that are dropped before being sent to one or more recipient applications, as well as to root cause analysis of the detected fault(s). According to the techniques herein, one or more capable nodes in a SAF network may detect a fault and then assess the impact scope (e.g., local or global) of the fault on the SAF network by analyzing performance metrics associated with network components (e.g., electronic devices, nodes, routers, sensors, actuators, etc.) residing within a network dependency group associated with the network component that is in fault state. The one or more capable nodes may generate time-series for the performance metrics of the relevant dependency group, and perform a MLS analysis on the respective time-series, which may determine a root cause of the fault(s). The one or more nodes may then perform local and global result propagation to exchange information about the root cause(s) to other electronic devices/nodes within the SAF network.

Different types of faults within a SAF may have widely different impact scopes. For example, the impact scope of certain types of faults may have a local impact (e.g., a line card upgrade may impact performance of the same line card), while other types of faults may have a global impact (e.g., a firmware upgrade on a field area router (FAR) may impact performance on a remote router, which is the other end of the routing for lossy protocol session). Failure to identify and capture the proper impact scope of a fault(s) may either lead to delayed detection after the damage has been done, or create a large number of false alarms. According to the techniques herein, the hierarchical structure of network components within a SAF and topological information about the SAF may be used to associate a fault, or faults, with a network dependency group within a hierarchy of network components.

Figure 3A:
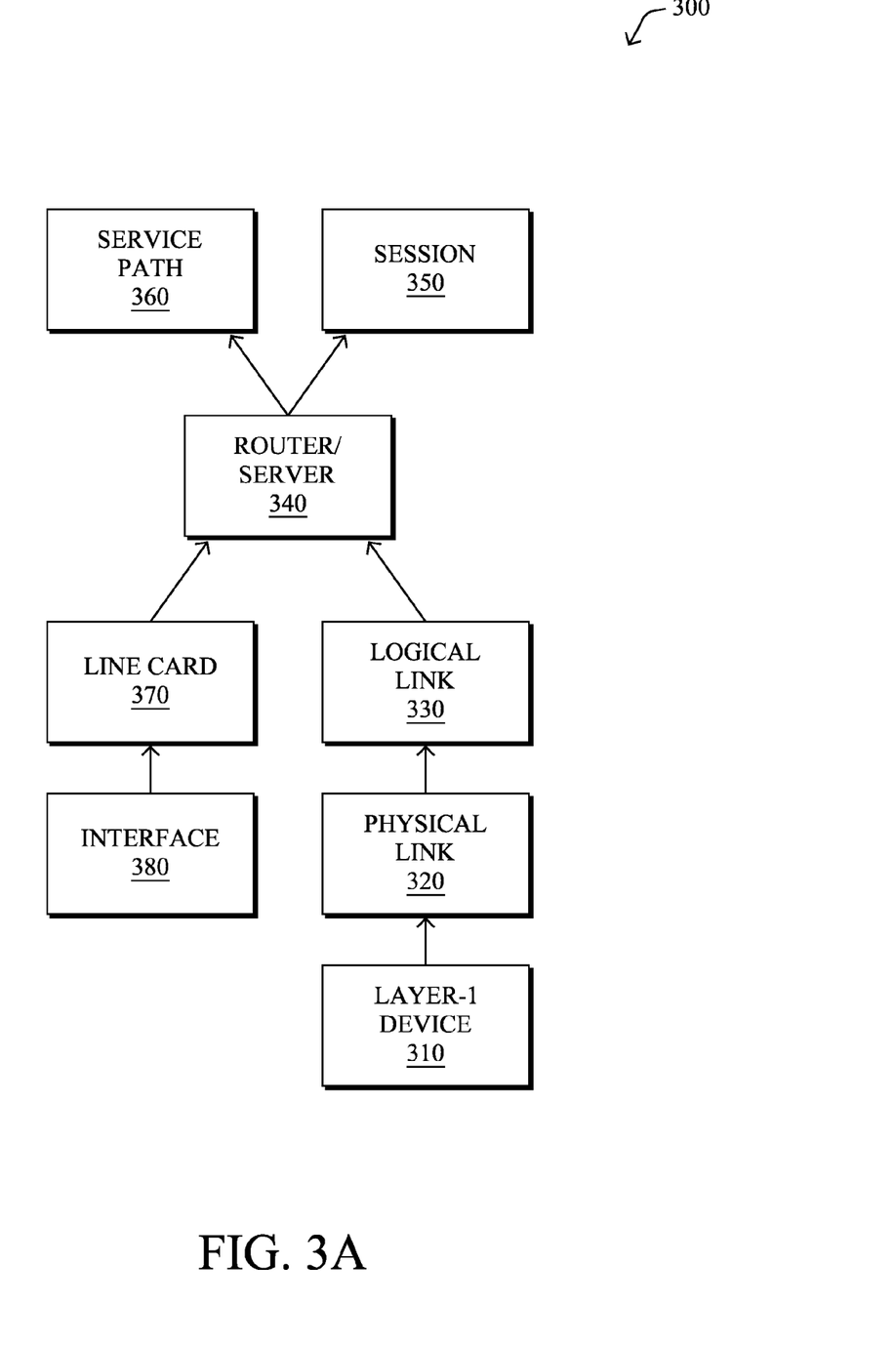
FIGS. 3A-3B illustrate an example view of a network hierarchy and a network dependency group.

FIG. 3A shows an exemplary hierarchy of network components 300 that may include a physical link 320 comprising one or more layer-1 devices 310, a logical link 330 comprising one or more physical links 320 that may connect two or more routers/servers 340, a line card 370 comprising multiple interfaces 380, the router/server 340 comprising one or more line cards 370, a service path 360 comprising multiple routers/servers 340 and logical links 330, and a session 350 comprising two or more routers/servers 340 that may be multiple hops away from each other.

Figure 3B:
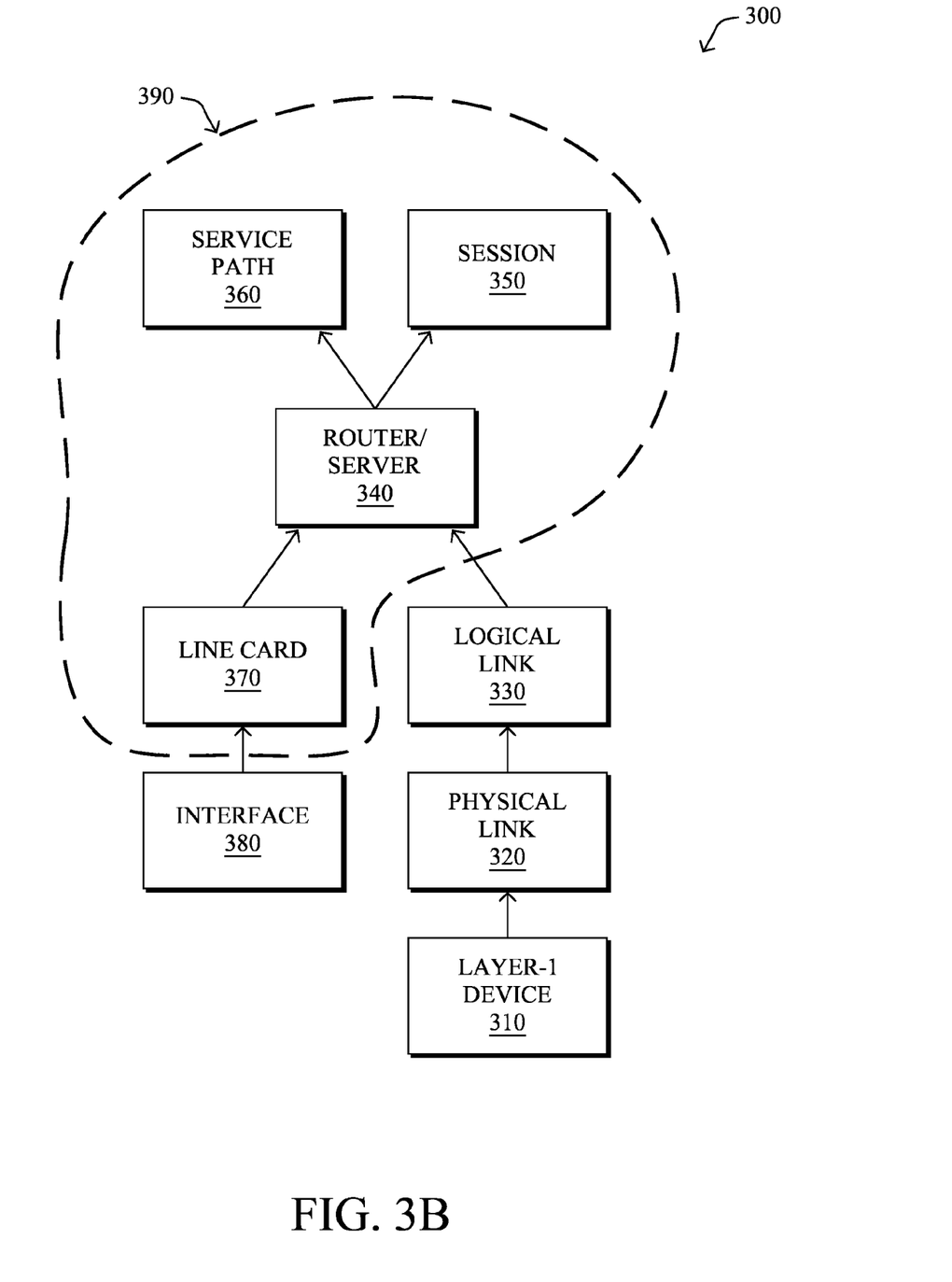

For any given network component (e.g., routers, nodes, sensors, actuators, line cards, etc.) under fault within the SAF, a network dependency group may be identified as a collection of network components at the same level in the hierarchy and any level higher up in the hierarchy. For example, as shown in FIG. 3B, if line card 370 is in a fault state, a network dependency group 390 may be identified that includes line card 370, the router/server 340 to which it belongs, any other line cards 370 associated with the same router/server 340, any protocol sessions 350 on the router, and all service paths 360 that have the router/server 340 on the service path 360.

According to the techniques herein, one or more capable nodes may automatically mine one or more or all performance metrics at an identified dependency group. For example, performance metric measurements may be derived from simple network management protocol management information bases (SNMP MIBs), device syslogs, service-level statistics, etc. SNMP MIBs are typically recorded at regular intervals (e.g., 1 minute, 5 minutes, 10 minutes, etc.) and capture average network statistics such as CPU and memory utilizations, packet counts, packet losses, packet errors, link load, packet errors and drops on the interfaces, end-to-end packet loss and delay, software errors, hardware faults, routing protocol flaps, etc. Device syslogs may also provide a rich source of information about protocol and link state changes, software error conditions, hardware faults and environmental conditions, etc. The one or more capable nodes may then monitor the impact of fault on the aforementioned metrics, and any change in performance immediately after the fault may be a good indicator that the change is a direct or indirect result of the fault. The techniques herein provide for the rapid assessment of fault impact scope, which may allow the damage to the SAF to be minimized or prevented.

To assess performance changes after the fault, a time-series may be constructed for each performance metric by dividing an original series of performance metric versus time into n equal time-bins. To facilitate rapid detection of impact scope, the techniques herein may use small time-bins (e.g., about 5, 4, 3, 2, 1, <1, etc. minutes). For metrics such as syslog messages, each time-bin may contain the frequency of the message. Furthermore, depending on the granularity of the network dependency group member (e.g., line card, router, etc.), measurements from network dependency group members lower in the network hierarchy may be aggregated. For example, in order to detect the impact scope of an operating system fault(s), performance metrics from all line cards and interfaces on the faulty router may be aggregated by computing the average per time-bin. Thus, multiple performance time-series are generated and analyzed to detect changes in the time-series that are induced by the fault.

Figure 4A:
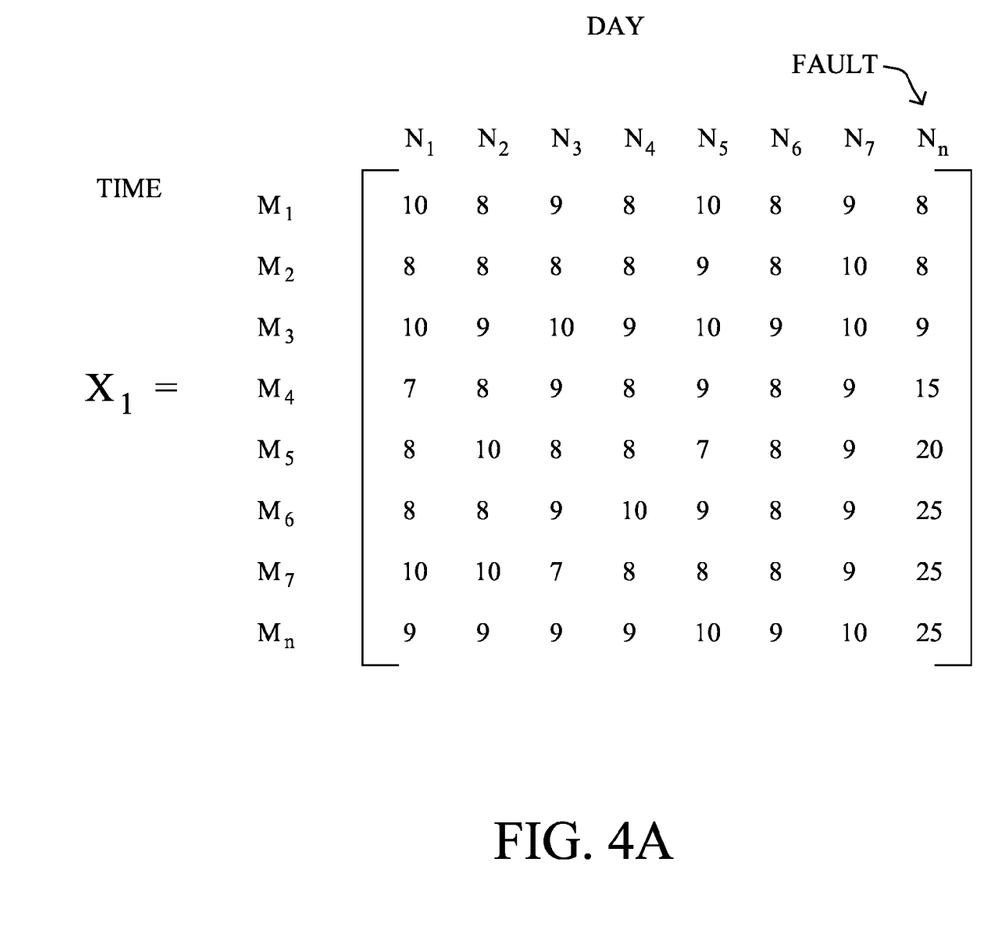
FIGS. 4A-4B illustrate example time-series matrices.

For each performance metric, time-series values before the fault may be compared to those after the fault to determine whether they are significantly different. For example, a matrix X may be constructed for each performance time-series with N columns (e.g., each column may correspond to a day, and the $N^{th}$ column may correspond to the day on which the fault occurred) and M rows (e.g., each row is a time-bin, e.g. 5-minutes). Illustratively, $X(i, j)$ may be the value of the performance metric on day j and time-bin i on day j. For example, as shown in FIG. 4A, an exemplary matrix $X_1$ may include performance time-series data spanning multiple days (e.g., columns $N_1$-$N_n$) and multiple time points per day (e.g., row $M_1$-$M_n$). The techniques herein may function to identify changes on the Nth day, which is the day of the fault. For example, as shown in FIG. 4A, abnormally high performance metric data values at time-bins $M_4,N_n$ through $M_n,N_n$ may indicate fault related changes.

Figure 4B:
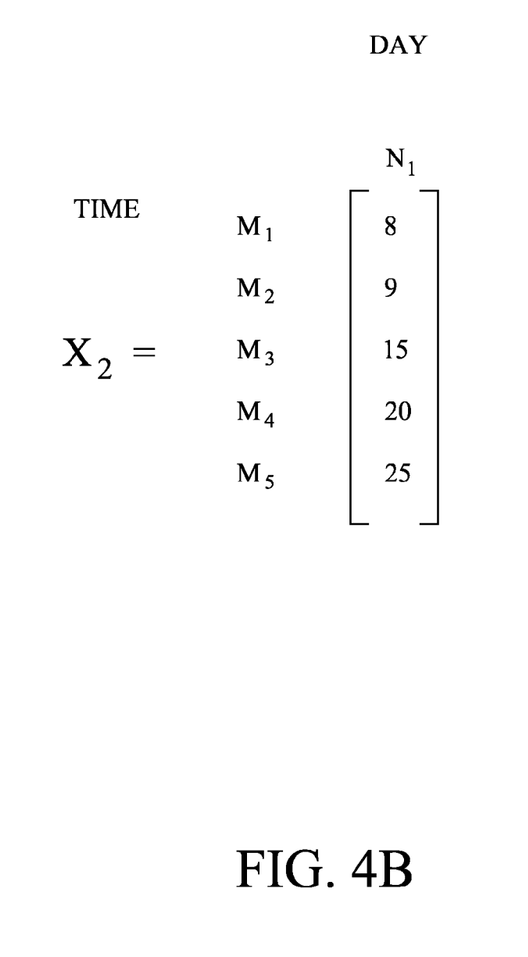

According to the techniques herein, the matrix X may be constructed as either a global or local subspace. For example, when matrix X is constructed using all of the time-bins within a day, the method is referred to as a global subspace (GS)(see, e.g., FIG. 4A). If instead, matrix X is constructed by focusing on a few time-bins surrounding the time at which the fault occurred, the method is referred to as a local subspace (LS). For example, as shown in FIG. 4B, an exemplary matrix $X_2$ may include performance time-series data spanning multiple time points (e.g., row $M_1$-$M_5$) surrounding the time at which the fault occurred on the day of the fault (e.g., columns $N_1$).

Generally, the techniques herein may construct a matrix X by a LS method using a few hours before and after the fault time, which means the matrix contains fewer rows than if it had been constructed using a GS method. An advantage of using a LS versus a GS approach is that changes outside the time segment of interest, which otherwise would contaminate the global normal subspace, may be filtered out of the root cause analysis. In practice, this is important because changes due to other failures or erroneous conditions in the SAF may occur at a different time or times from the changes due to the existing fault. However, a local subspace method using the regular singular value decomposition (SVD) is still problematic because it cannot mitigate the problems that result due to contamination within the local time segment.

In particular, the original SVD uses $l_2$-norm to compute the low-rank normal subspace; consequently, it suffers from inaccurate detection rates and high false positive rates when there are large outliers in a data set. The use of $l_1$-norm to compute the low-rank normal subspace may be advantageous because it is more robust to outliers. Past research shows that for sparse residual matrix $X_R$ and low-rank matrix $X_N$ capturing the normal subspace, the normal subspace may be recovered by solving the constrained minimization problem "EQ(1)" of FIG. 5.

Figure 5:
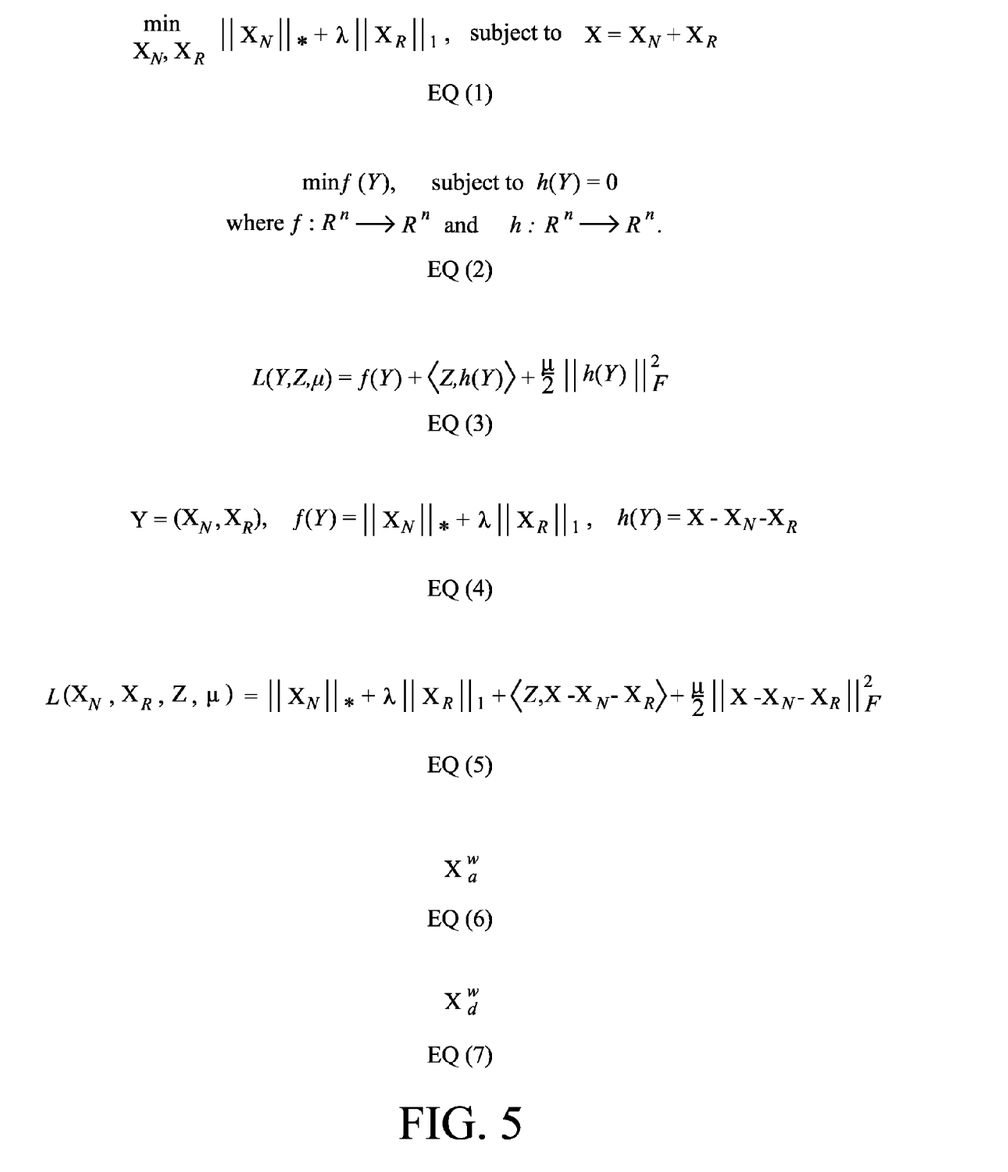
FIG. 5 illustrates example multiscale local subspace equations.

In particular, in EQ(1), $\|.\|^*$ denotes the nuclear norm of a matrix (i.e., the sum of its singular values), $\|.\|_1$ denotes the sum or $l_1$-norm of the absolute values of matrix entries, and lambda is a regularization parameter. The optimization equation listed above, referred to as Robust SVD, may be treated as a general convex optimization problem and may be solved using any off-the-shelf interior point solvers after being re-formulated as a semi-definite program.

According to the techniques herein, an alternating direction method (ADM) may be used to scale for large matrices. For example, augmented Lagrange multipliers may be used for solving constrained optimization problems of the kind represented by EQ(2) in FIG. 5. The augmented Lagrangian function may then be represented by EQ(3) in FIG. 5, where μ is a positive scalar, Z is the Lagrangian multipliers, <A, B> is the trace norm of $A^TB$ and $\|\cdot\|_F$ is the Frobenius norm. For the above optimization problem, the augmented Lagrange multiplier method may be applied using EQ(4) in FIG. 5. Then, the Lagrangian function may be represented by EQ(5) in FIG. 5.

The ADM according to the techniques herein then progresses in an iterative fashion. During each iteration, the method alternates among the optimization of each one of $X_N$, $X_R$ and Z, while fixing the other variables. The method may allow rapid convergence if the variable μ is increased by a constant factor p≥1 during each iteration.

In another embodiment, efficiency may be further increased by replacing exact optimization with approximate optimization during each iteration.

Multiscale differencing may be applied on the performance time-series and then the low-rank normal subspace may be computed using $l_1$-norm. Such differencing may have the beneficial property of converting big level-shifts or ramp-ups in performance metric data into spikes. Multiscale Haar wavelet transformation may then be used to achieve differencing at multiple time scales. The wavelet transform may be applied to each column of the performance time-series X, thereby producing two matrices—represented by EQ(6) and EQ(7), respectively, in FIG. 5—consisting, consisting of the approximation (or averaging) and detail (or differencing) coefficients. The difference coefficients represented by EQ(7) in FIG. 5 are then input to the low-rank subspace computation using $l_1$-norm that can then handle the spikes in coefficients (if any) and accurately construct the normal subspace. Without being bound by any particular theory, application of wavelet analysis may not be for the purpose of de-noising, but rather de-correlating the performance metric time-series data and turning high energy outliers like level-shifts and ramp-ups into spikes in wavelet coefficients. According to the techniques herein, a local subspace analysis may be performed by explicitly focusing on time-bins around the fault time—a method referred to herein as multiscale local subspace (MLS).

Figure 6:
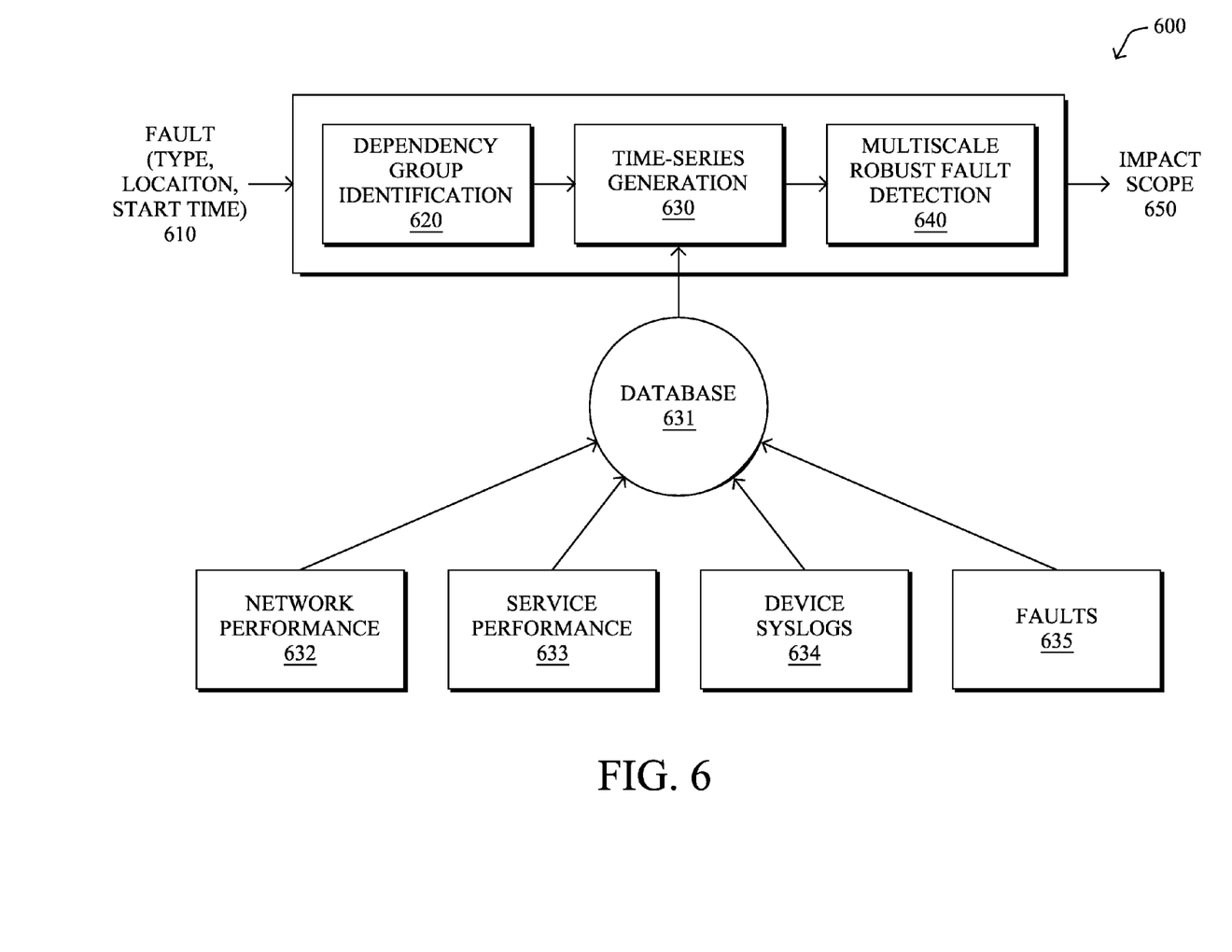
FIG. 6 illustrates an example view of a process for determining fault impact scope.

According to one illustrative embodiment depicted in FIG. 6, an impact scope determination process 600 may begin with the identification/detection of a fault 610, which may include obtaining a variety of data associated with fault 610 such as, for example, type of fault, location of fault, fault time, etc. Impact scope determination process 600 then identifies a network dependency group 620 associated with the node/device experiencing fault 610. A time-series 630 is then generated for performance metrics pertaining to components within network dependency group 620. Time-series 630 may be generated from performance metric data stored in database 631, which may, in turn, be derived from a variety of network system sources including, for example, network performance data 632, service performance data 633, device syslogs 634, faults 635, etc. Once time-series 630 is generated, multiscale robust fault detection may be applied to the time-series, as described in detail above, to determine the fault impact scope 650.

According to the techniques herein, root cause analysis may be a distributed task that is performed by various nodes/devices at different levels in the network hierarchy.

In view of the distributed nature of the processes herein, there may be a mechanism that exchanges this information (e.g., impact scope, root cause, etc.) between the nodes/devices in the network to effectively address the fault and communicate possible remedies. For example, FAR(s) may generate a response message that contains the results of local subspace analysis such as, for example, the source of the fault, timestamp, dependencies (other devices that are impacted due to the fault in the system), etc. The message may be sent to other nodes (e.g., Root, FAR(s), LBR(s), etc.) for supplementary processing, e.g., for them to determine whether the results of the root cause analysis affect them. If necessary, the neighboring FAR(s) may need to take action to remedy the fault detected by the root-cause analysis. The response message may also be sent to the NMS system for logging and global analysis/visualization of data, which may also allow a user/administrator to fix configuration issues based on the data that is generated by the different components of the system.

Figure 7:
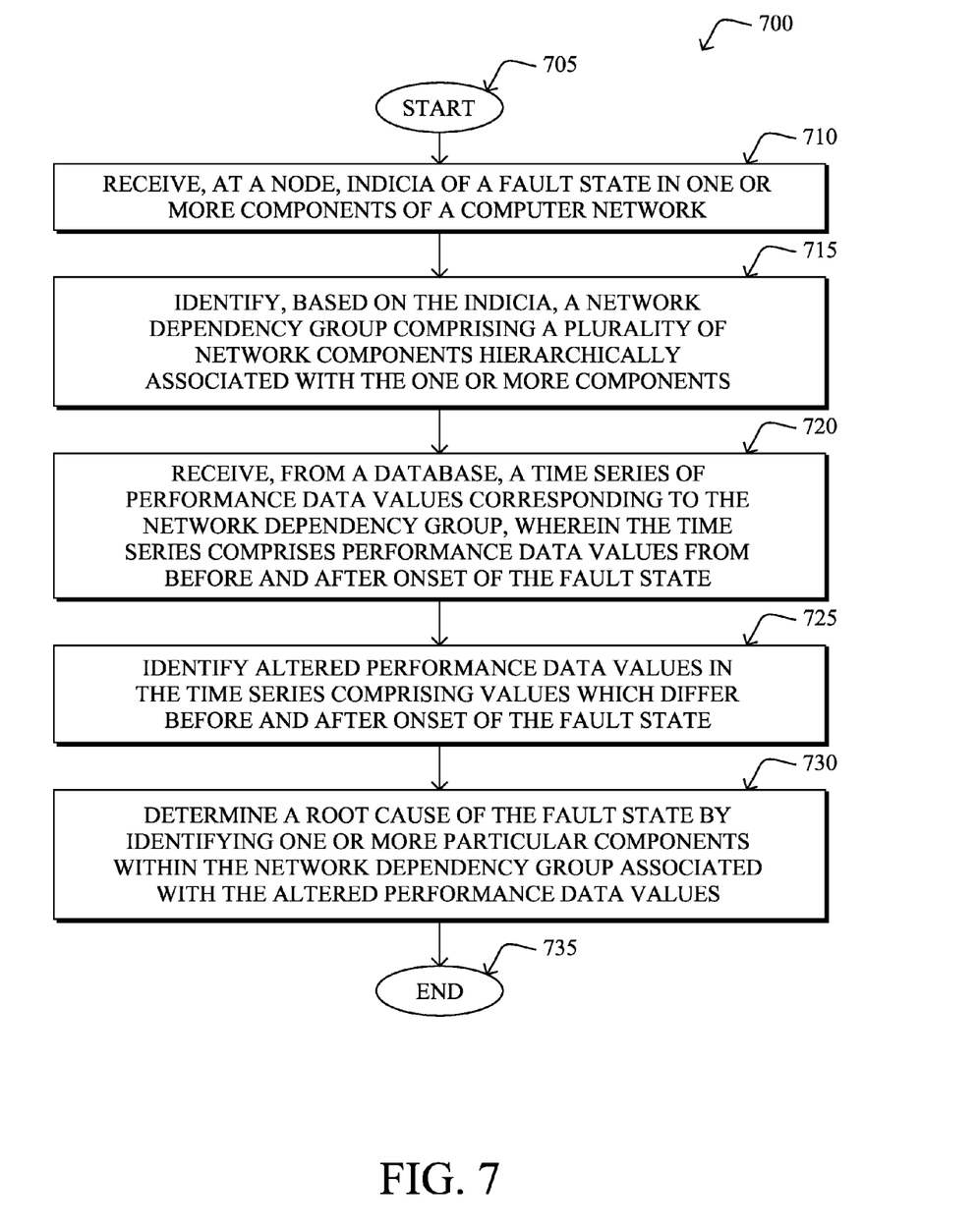
FIG. 7 illustrates an example simplified procedure for root cause analysis in a sensor-actuator fabric.

FIG. 7 illustrates an example simplified procedure for root cause analysis in a sensor-actuator fabric (SAF) in accordance with one or more embodiments described herein. The procedure 700 may start at step 705, and continues to step 710, where, as described in greater detail above, a node may receive indicia of a fault state in one or more components of a computer network (e.g., a SAF). Based on the indicia, the node may then identify a network dependency group including a plurality of network components that are hierarchically associated with the one or more components, as shown in step 715. The node may then receive, from a database, a time series of performance data values corresponding to the network dependency group, wherein the time series comprises performance data values from before and after the onset of the fault state, as illustrated by step 720. In step 725, the node may then identify altered performance data values in the time-series comprising values which differ before and after onset of the fault state, and then determine a root cause of the fault state by identifying one or more particular components within the network dependency group that are associated with the altered performance data values, as shown in step 730. The procedure 700 may illustratively end in step 735, though notably with the option to return to any appropriate step described above.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for root cause analysis in a computer network (e.g., a SAF, smart grid, etc.) by tracking performance changes that occur as a result of the fault. The techniques herein may use a robust multiscale local subspace algorithm to accurately indentify changes in performance even when the baseline is severely contaminated. The intelligent and robust nature of the architecture described herein may allow it to automate and track faults from very large scale sensing data with high confidence.

While there have been shown and described illustrative embodiments that provide for root cause analysis in a SAF in a connected environment, it is to be understood that various other adaptations and modifications may be made within the spirit and scope of the embodiments herein. For example, the embodiments have been shown and described herein with relation to a SAF network. However, the embodiments in their broader sense are not as limited, and may, in fact, be used with other types of shared-media networks and/or protocols (e.g., wireless). In addition, while certain protocols are shown, such as RPL, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   receiving, at a node, indicia of a fault state in one or more components of a sensor-actuator fabric;
   identifying, based on the indicia, a network dependency group comprising a plurality of network components hierarchically associated with the one or more components;
   receiving, from a database, a time series of performance data values corresponding to the network dependency group, wherein the time series comprises performance data values from before and after onset of the fault state;
   identifying altered performance data values in the time series comprising values which differ before and after onset of the fault state; and
   determining a root cause of the fault state by identifying one or more particular components within the network dependency group associated with the altered performance data values.

2. The method as in claim 1, further comprising:
   identifying, based on the root cause of the fault state, one or more affected nodes which need to respond to the fault; and
   communicating to the one or more affected nodes a response message.

3. The method as in claim 2, further comprising:
   determining a response for each of the one or more affected nodes; and
   including the determined response in the response message.

4. The method as in claim 1, wherein the network dependency group comprises network components that are at an equivalent, or greater, level in the network component hierarchy.

5. The method as in claim 1, wherein determining further comprises:
   constructing a matrix for one or more time-series of performance values;
   optimizing the matrix by robust single value decomposition (SVD); and
   applying a multiscale local subspace analysis to the matrix to determine the root cause.

6. The method as in claim 5, wherein the multiscale local subspace analysis comprises an iterative alternating direction method for scaling the matrix.

7. The method as in claim 1, wherein the time-series of performance data is based on information provided by sources, wherein the sources are simple network management protocol management information bases (SNMP MIBs), device syslogs, or service-level statistics.

8. The method as in claim 1, wherein the node is a device wherein the device is a low-power and lossy network border router (LBR), a network management system (NMS), a capable node, or any combination thereof.

9. An apparatus, comprising:
   one or more network interfaces to communicate with a sensor-actuator fabric;
   a processor coupled to the network interfaces and adapted to execute one or more processes; and
   a memory configured to store a process executable by the processor, the process when executed operable to:
      receive indicia of a fault state in one or more components of a sensor-actuator fabric;
      identify, based on the indicia, a network dependency group comprising a plurality of network components hierarchically associated with the one or more components;
      receive, from a database, a time series of performance data values corresponding to the network dependency group, wherein the time series comprises performance data values from before and after onset of the fault state;
      identify altered performance data values in the time series comprising values which differ before and after onset of the fault state;
      correlate the altered performance data values with one or more components within the network dependency group; and
      determine a root cause of the fault state.

10. The apparatus as in claim 9, wherein the process when executed is further operable to:
    identify, based on the root cause of the fault state, one or more affected nodes which need to respond to the fault; and
    communicate a response message to the one or more affected nodes.

11. The apparatus as in claim 10, wherein the process when executed is further operable to:
    determine a response for each of the one or more affected nodes; and
    include the determined response in the response message.

12. The apparatus as in claim 9, wherein the network dependency group comprises network components that are at an equivalent, or greater, level in the network component hierarchy.

13. The apparatus as in claim 9, wherein the process when executed is further operable to:
construct a matrix for one or more time-series of performance values;
optimize the matrix by robust single value decomposition (SVD); and
apply a multiscale local subspace analysis to the matrix to determine the root cause.

14. The apparatus as in claim 13, wherein the multiscale local subspace analysis comprises an iterative alternating direction method for scaling the matrix.

15. The apparatus as in claim 9, wherein the time-series of performance data is based on information provided by sources wherein the sources are simple network management protocol management information bases (SNMP MIBs), device syslogs, or service-level statistics.

16. A tangible, non-transitory, computer-readable media having software encoded thereon, the software when executed by a processor operable to:
receive indicia of a fault state in one or more components of a sensor-actuator fabric;
identify, based on the indicia, a network dependency group comprising a plurality of network components hierarchically associated with the one or more components;
receive, from a database, a time series of performance data values corresponding to the network dependency group, wherein the time series comprises performance data values from before and after onset of the fault state;
identify altered performance data values in the time series comprising values which differ before and after onset of the fault state;
correlate the altered performance data values with one or more components within the network dependency group; and
determine a root cause of the fault state.

17. The computer-readable media as in claim 16, wherein the software when executed is further operable to:
identify, based on the root cause of the fault state, one or more affected nodes which need to respond to the fault; and
communicate to the one or more affected nodes a response message.

18. The computer-readable media as in claim 17, wherein the software when executed is further operable to:
determine a response for each of the one or more affected nodes; and
include the determined response in the response message.

19. The computer-readable media as in claim 16, wherein the software when executed is further operable to:
construct a matrix for one or more time-series of performance values;
optimize the matrix by robust single value decomposition (SVD); and
apply a multiscale local subspace analysis to the matrix to determine the root cause.

20. The computer-readable media as in claim 19, wherein the multiscale local subspace analysis comprises an iterative alternating direction method for scaling the matrix.

\* \* \* \* \*

UNITED STATES PATENT AND TRADEMARK OFFICE
CERTIFICATE OF CORRECTION

Page 1 of 1

PATENT NO. : 9,037,896 B2
APPLICATION NO. : 13/668979
DATED : May 19, 2015
INVENTOR(S) : Addepalli et al.

It is certified that error appears in the above-identified patent and that said Letters Patent is hereby corrected as shown below:

In The Specification

In column 11, line 9, please replace:
"indentify" with "identify"

Signed and Sealed this
Tenth Day of November, 2015

Michelle K. Lee
*Director of the United States Patent and Trademark Office*